(12) United States Patent
Yaemglin et al.

(10) Patent No.: US 9,343,084 B2
(45) Date of Patent: May 17, 2016

(54) SYSTEMS AND METHODS FOR CORRECTING SLIDER PARALLELISM ERROR USING COMPENSATION LAPPING

(75) Inventors: Theera Yaemglin, Kukot (TH); Chakkrit Supavasuthi, Chatuchak (TH)

(73) Assignee: Western Digital Technologies, Inc., Irvine, CA (US)

( * ) Notice: Subject to any disclaimer, the term of this patent is extended or adjusted under 35 U.S.C. 154(b) by 898 days.

(21) Appl. No.: 13/420,281

(22) Filed: Mar. 14, 2012

(65) Prior Publication Data

US 2013/0244541 A1    Sep. 19, 2013

(51) Int. Cl.
*B24B 37/30* (2012.01)
*B24B 1/00* (2006.01)
*G11B 5/10* (2006.01)
*G11B 5/31* (2006.01)

(52) U.S. Cl.
CPC .............. *G11B 5/102* (2013.01); *G11B 5/3169* (2013.01)

(58) Field of Classification Search
CPC ............................. G11B 5/102; G11B 5/3169
USPC ........... 360/234.3–237.1; 29/603; 451/28, 41, 451/259, 398
See application file for complete search history.

(56) References Cited

U.S. PATENT DOCUMENTS

| | | | |
|---|---|---|---|
| 3,867,797 A * | 2/1975 | Meier | 451/286 |
| 4,624,564 A * | 11/1986 | Dahlgren | 356/243.3 |
| 4,918,869 A * | 4/1990 | Kitta | 451/288 |
| 5,117,589 A | 6/1992 | Bischoff et al. | |
| 5,905,613 A * | 5/1999 | Biskeborn et al. | 360/130.21 |
| 6,073,337 A * | 6/2000 | Strom | 29/603.12 |
| 6,075,673 A | 6/2000 | Wilde et al. | |
| 6,097,575 A | 8/2000 | Trang et al. | |
| 6,120,352 A * | 9/2000 | Duescher | 451/41 |
| 6,123,608 A * | 9/2000 | Nakagawa et al. | 451/259 |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,217,425 B1 | 4/2001 | Shindou et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,261,165 B1 | 7/2001 | Lackey et al. | |

(Continued)

FOREIGN PATENT DOCUMENTS

JP    08096319 A * 4/1996 ............... G11B 5/23

*Primary Examiner* — Lee D Wilson
*Assistant Examiner* — Marc Carlson (57) ABSTRACT

Systems and methods for correcting slider parallelism error using compensation lapping are described. One such system includes a lapping support including at least one mounting surface having a preselected mounting angle such that a line normal to the at least one mounting surface is not parallel to a centerline of the lapping support, a rowbar including a plurality of magnetic transducers spaced apart along a length of the rowbar, and a lapping plate configured to lap the rowbar, where the rowbar is mounted to the at least one mounting surface, and where the rowbar is configured to be brought into contact with the lapping plate.

28 Claims, 6 Drawing Sheets

(56) References Cited

U.S. PATENT DOCUMENTS

| | | | |
|---|---|---|---|
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,375,539 B1 | 4/2002 | Sudo et al. | |
| 6,378,195 B1 | 4/2002 | Carlson | |
| 6,466,257 B1 | 10/2002 | Baugh et al. | |
| 6,522,504 B1 | 2/2003 | Casey | |
| 6,538,850 B1 | 3/2003 | Hadian et al. | |
| 6,545,844 B1 * | 4/2003 | Schaenzer et al. | 360/245.4 |
| 6,546,355 B2 * | 4/2003 | Matsushita | 702/152 |
| 6,551,438 B1 | 4/2003 | Tanemura | |
| 6,583,953 B1 | 6/2003 | Han et al. | |
| 6,604,989 B2 | 8/2003 | Yanagida et al. | |
| 6,646,832 B2 | 11/2003 | Anaya-Dufresne et al. | |
| 6,661,612 B1 | 12/2003 | Peng | |
| 6,662,069 B1 * | 12/2003 | Khlif | 700/117 |
| 6,665,146 B2 | 12/2003 | Hawwa et al. | |
| 6,679,760 B2 * | 1/2004 | Fukuroi et al. | 451/41 |
| 6,687,976 B1 * | 2/2004 | Koyama et al. | 29/603.12 |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |
| 6,721,142 B1 | 4/2004 | Meyer et al. | |
| 6,744,599 B1 | 6/2004 | Peng et al. | |
| 6,771,468 B1 | 8/2004 | Levi et al. | |
| 6,796,018 B1 | 9/2004 | Thornton | |
| 6,801,402 B1 | 10/2004 | Subrahmanyam et al. | |
| 6,802,761 B1 | 10/2004 | Beaucage et al. | |
| 6,844,144 B2 * | 1/2005 | Krause et al. | 430/320 |
| 6,856,489 B2 | 2/2005 | Hawwa et al. | |
| 6,872,123 B2 | 3/2005 | Sudo et al. | |
| 6,873,496 B1 | 3/2005 | Sun et al. | |
| 6,884,148 B1 | 4/2005 | Dovek et al. | |
| 6,912,103 B1 | 6/2005 | Peng et al. | |
| 6,937,439 B1 | 8/2005 | Chang et al. | |
| 6,956,718 B1 | 10/2005 | Kulkarni et al. | |
| 6,972,930 B1 | 12/2005 | Tang et al. | |
| 7,006,330 B1 | 2/2006 | Subrahmanyam et al. | |
| 7,006,331 B1 | 2/2006 | Subrahmanyam et al. | |
| 7,010,847 B1 | 3/2006 | Hadian et al. | |
| 7,019,945 B1 | 3/2006 | Peng et al. | |
| 7,027,264 B1 | 4/2006 | Subrahmanyam et al. | |
| 7,072,136 B2 | 7/2006 | Pit et al. | |
| 7,085,104 B1 | 8/2006 | Hadian et al. | |
| 7,099,117 B1 | 8/2006 | Subrahmanyam et al. | |
| 7,174,622 B2 | 2/2007 | Meyer et al. | |
| 7,281,317 B2 * | 10/2007 | Ohno et al. | 29/603.16 |
| 7,289,299 B1 | 10/2007 | Sun et al. | |
| 7,307,816 B1 | 12/2007 | Thornton et al. | |
| 7,315,435 B1 | 1/2008 | Pan | |
| 7,315,436 B1 | 1/2008 | Sanchez | |
| 7,392,580 B2 * | 7/2008 | Fukuroi et al. | 29/603.16 |
| 7,414,814 B1 | 8/2008 | Pan | |
| 7,436,631 B1 | 10/2008 | Fanslau, Jr. et al. | |
| 7,474,508 B1 | 1/2009 | Li et al. | |
| 7,477,486 B1 | 1/2009 | Sun et al. | |
| 7,593,190 B1 | 9/2009 | Thornton et al. | |
| 7,595,963 B1 | 9/2009 | Chen et al. | |
| 7,616,405 B2 | 11/2009 | Hu et al. | |
| 7,681,303 B2 * | 3/2010 | Kondo et al. | 29/603.12 |
| 7,729,089 B1 | 6/2010 | Hogan | |
| 7,805,827 B2 * | 10/2010 | Yasui et al. | 29/603.03 |
| 7,871,306 B1 | 1/2011 | Lytle | |
| 7,995,310 B1 | 8/2011 | Pan | |
| 8,081,400 B1 | 12/2011 | Hu | |
| 8,087,973 B1 | 1/2012 | Sladek et al. | |
| 8,089,730 B1 | 1/2012 | Pan et al. | |
| 8,136,805 B1 * | 3/2012 | Lee | 269/58 |
| 8,164,858 B1 | 4/2012 | Moravec et al. | |
| 8,199,437 B1 | 6/2012 | Sun et al. | |
| 8,208,224 B1 | 6/2012 | Teo et al. | |
| 8,218,268 B1 | 7/2012 | Pan | |
| 8,240,545 B1 | 8/2012 | Wang et al. | |
| 8,256,272 B1 | 9/2012 | Roajanasiri et al. | |
| 8,295,012 B1 | 10/2012 | Tian et al. | |
| 8,295,013 B1 | 10/2012 | Pan et al. | |
| 8,295,014 B1 | 10/2012 | Teo et al. | |
| 8,320,084 B1 | 11/2012 | Shum et al. | |
| 8,325,446 B1 | 12/2012 | Liu et al. | |
| 8,325,447 B1 | 12/2012 | Pan | |
| 8,339,742 B1 | 12/2012 | Sladek et al. | |
| 8,339,747 B1 | 12/2012 | Hales et al. | |
| 8,339,748 B2 | 12/2012 | Shum et al. | |
| 8,343,363 B1 | 1/2013 | Pakpum et al. | |
| 8,345,519 B1 | 1/2013 | Pan | |
| 8,418,353 B1 | 4/2013 | Moravec et al. | |
| 8,441,896 B2 | 5/2013 | Wang et al. | |
| 8,446,694 B1 | 5/2013 | Tian et al. | |
| 8,456,643 B2 | 6/2013 | Prabhakaran et al. | |
| 8,456,776 B1 | 6/2013 | Pan | |
| 8,462,462 B1 | 6/2013 | Moravec et al. | |
| 8,477,459 B1 | 7/2013 | Pan | |
| 8,485,579 B2 | 7/2013 | Roajanasiri et al. | |
| 8,488,279 B1 | 7/2013 | Pan et al. | |
| 8,488,281 B1 | 7/2013 | Pan | |
| 8,490,211 B1 | 7/2013 | Leary | |
| 8,514,522 B1 | 8/2013 | Pan et al. | |
| 8,533,936 B1 | 9/2013 | Puttichaem et al. | |
| 8,545,164 B2 | 10/2013 | Choumwong et al. | |
| 8,553,365 B1 | 10/2013 | Shapiro et al. | |
| 8,587,901 B1 | 11/2013 | Puttichaem et al. | |
| 8,593,764 B1 | 11/2013 | Tian et al. | |
| 8,599,653 B1 | 12/2013 | Mallary et al. | |
| 8,605,389 B1 | 12/2013 | Pan et al. | |
| 8,611,050 B1 | 12/2013 | Moravec et al. | |
| 8,611,052 B1 | 12/2013 | Pan et al. | |
| 8,623,197 B1 | 1/2014 | Kobsiriphat et al. | |
| 8,624,184 B1 | 1/2014 | Souza et al. | |
| 8,665,566 B1 | 3/2014 | Pan et al. | |
| 8,665,567 B2 | 3/2014 | Shum et al. | |
| 8,665,677 B1 | 3/2014 | Panitchakan et al. | |
| 8,665,690 B1 | 3/2014 | Moravec et al. | |
| 8,693,144 B1 | 4/2014 | Pan et al. | |
| 8,756,795 B1 | 6/2014 | Moravec et al. | |
| 8,758,083 B1 | 6/2014 | Rudy et al. | |
| 8,760,812 B1 | 6/2014 | Chen et al. | |
| 8,770,463 B1 | 7/2014 | Puttichaem et al. | |
| 8,773,664 B1 | 7/2014 | Wang et al. | |
| 8,792,212 B1 | 7/2014 | Pan et al. | |
| 8,792,213 B1 | 7/2014 | Vijay et al. | |
| 8,797,691 B1 | 8/2014 | Tian et al. | |
| 8,834,661 B1 * | 9/2014 | Ziggi et al. | 156/235 |
| 2001/0056334 A1 * | 12/2001 | Matsushita | 702/150 |
| 2002/0016130 A1 | 2/2002 | Nomura et al. | |
| 2002/0126421 A1 * | 9/2002 | Takahashi et al. | 360/313 |
| 2002/0191341 A1 * | 12/2002 | Kohira et al. | 360/235.8 |
| 2003/0128470 A1 * | 7/2003 | Sasaki et al. | 360/235.7 |
| 2004/0033763 A1 | 2/2004 | Bunch et al. | |
| 2004/0176013 A1 | 9/2004 | Church et al. | |
| 2005/0002124 A1 | 1/2005 | Bunch et al. | |
| 2005/0032469 A1 | 2/2005 | Duescher | 451/548 |
| 2005/0128640 A1 * | 6/2005 | Biskeborn et al. | 360/129 |
| 2005/0176351 A1 * | 8/2005 | Singh, Jr. | 451/28 |
| 2005/0284207 A1 * | 12/2005 | Biskeborn et al. | 73/7 |
| 2006/0232883 A1 * | 10/2006 | Biskeborn et al. | 360/129 |
| 2007/0030594 A1 * | 2/2007 | Biskeborn et al. | 360/129 |
| 2007/0044298 A1 * | 3/2007 | Fukuroi et al. | 29/603.12 |
| 2007/0115589 A1 * | 5/2007 | Huang et al. | 360/235.1 |
| 2007/0123150 A1 | 5/2007 | Bunch et al. | |
| 2007/0247747 A1 * | 10/2007 | Benakli et al. | 360/125 |
| 2008/0022510 A1 * | 1/2008 | Tanaka | 29/603.16 |
| 2008/0072418 A1 * | 3/2008 | Kondo et al. | 29/603.12 |
| 2008/0141522 A1 | 6/2008 | Baer et al. | |
| 2009/0165287 A1 * | 7/2009 | Nomura et al. | 29/603.12 |
| 2009/0313811 A1 * | 12/2009 | Takahashi et al. | 29/603.23 |
| 2010/0003904 A1 * | 1/2010 | Duescher | 451/259 |
| 2010/0061002 A1 * | 3/2010 | Nakagomi et al. | 360/31 |
| 2010/0279586 A1 * | 11/2010 | Schwappach | 451/28 |
| 2010/0330890 A1 * | 12/2010 | Boutaghou | 451/540 |

(56) References Cited

U.S. PATENT DOCUMENTS

| | | | |
|---|---|---|---|
| 2012/0009856 A1* | 1/2012 | Moudry et al. | 451/540 |
| 2012/0105999 A1* | 5/2012 | Chen et al. | 360/75 |
| 2012/0281315 A1* | 11/2012 | Schwappach et al. | 360/234.5 |
| 2013/0212871 A1* | 8/2013 | Lueng et al. | 29/603.08 |
| 2013/0244541 A1 | 9/2013 | Yaemglin et al. | |
| 2013/0293982 A1 | 11/2013 | Huber | |

* cited by examiner

SYSTEMS AND METHODS FOR CORRECTING SLIDER PARALLELISM ERROR USING COMPENSATION LAPPING

FIELD

The present invention relates generally to manufacturing disk based information storage devices, and more specifically to systems and methods for correcting slider parallelism error using compensation lapping.

BACKGROUND

Magnetic transducers or sliders are manufactured for use in disk based information storage devices. The sliders are positioned above a rotating magnetic disk using a suspension structure and have a bottom or air bearing surface (ABS) that effectively floats on air generated as the magnetic disk rotates. A certain degree of lateral tilt or pitch static attitude (PSA) is desirable for correcting for wafer geometries or for obtaining a preselected level of magnetic transducer performance. However, this change in PSA can negatively impact the overall parallelism of the slider thereby decreasing the slider performance. Techniques for PSA adjustment and correcting slider parallelism at a head gimbal assembly (HGA) level have been proposed. For example, U.S. Pat. No. 7,072,136 describes a method and apparatus for dynamically establishing pitch static attitude in a hard disk drive. However, systems implementing these techniques are typically complicated and extremely expensive. Accordingly, systems and methods for correcting slider parallelism without these drawbacks are needed.

SUMMARY

Aspects of the invention are related to systems and methods for correcting slider parallelism error using compensation lapping. In one embodiment, the invention is related to a system for correcting slider parallelism, the system including a lapping support including at least one mounting surface having a preselected mounting angle such that a line normal to the at least one mounting surface is not parallel to a centerline of the lapping support, a rowbar including a plurality of magnetic transducers spaced apart along a length of the rowbar, and a lapping plate configured to lap the rowbar, where the rowbar is mounted to the at least one mounting surface, and where the rowbar is configured to be brought into contact with the lapping plate.

In another embodiment, the invention relates to a method for correcting slider parallelism using a lapping support including at least one mounting surface having a preselected mounting angle such that a line normal to the at least one mounting surface is not parallel to a centerline of the lapping support, the method including providing a rowbar including a plurality of magnetic transducers spaced apart along a length of the rowbar, mounting the rowbar to the at least one mounting surface of the lapping support, moving the lapping support such that the rowbar makes contact with a lapping plate, and lapping a surface of the rowbar using the lapping plate.

In yet another embodiment, the invention relates to a method for correcting slider parallelism, the method including providing a rowbar including a block shape including an air bearing surface (ABS), a backside surface opposite the ABS, a leading edge side surface, a trailing edge side surface, and two end surfaces, where the rowbar includes a plurality of magnetic transducers spaced apart along a length of the rowbar, lapping the backside surface to induce a preselected tilt angle on the backside surface relative to the trailing edge surface that is greater than, or less than, 90 degrees, and lapping the ABS to induce a preselected tilt angle on the ABS relative to the trailing edge surface such that the lapped ABS is substantially parallel to the lapped backside surface.

DETAILED DESCRIPTION

Referring now to the drawings, systems and methods for correcting slider parallelism error using compensation lapping are illustrated. The systems include a lapping support having at least one mounting surface with a preselected mounting angle such that a line normal to the at least one mounting surface is not parallel to a centerline of the lapping support (e.g., non-zero angle with respect to a horizontal direction), a rowbar including a plurality of magnetic transducers spaced apart along a length of the rowbar, and a lapping plate configured to lap the rowbar. The rowbar can be mounted to the at least one mounting surface, and is configured to be brought into contact with the lapping plate. The rowbar, which will later be diced into a number of sliders, can have a block shape including an air bearing surface (ABS) and a backside surface opposite the ABS.

The ABS can be mounted to the lapping support such that the backside surface is lapped first. Subsequently, the backside surface can be mounted to a second lapping support with a zero angle mounting surface (e.g., substantially flat with respect to the horizontal direction) and the ABS can be lapped to be substantially parallel to the backside surface. As the other sides of the rowbar can be initially parallel as well for the block shape, the final rowbar can have a cross section with a parallelogram shape. In such case, a preselected angle of the backside surface with respect to a trailing edge surface of the rowbar can be substantially supplementary (e.g., add up to 180 degrees) to a preselected angle of the ABS also with respect to the trailing edge surface. This parallelogram shape which persists for the sliders diced from the rowbar can provide optimized magnetic performance for the sliders while also allowing for an extended pitch static attitude (PSA) variation or tilt range. In several embodiments, the lapping support and second lapping support are shaped as lapping rings.

The methods for correcting slider parallelism error using compensation lapping can include providing a rowbar including a plurality of magnetic transducers spaced apart along a length of the rowbar, mounting the rowbar to the at least one mounting surface of the lapping support, moving the lapping support such that the rowbar makes contact with a lapping plate, and lapping a surface of the rowbar using the lapping plate. In other embodiments, the backside surface and ABS are lapped to induce a preselected tilt angle on the ABS relative to the trailing edge surface such that the lapped ABS is substantially parallel to the lapped backside surface, and the lapping support is optional.

Figure 1A:
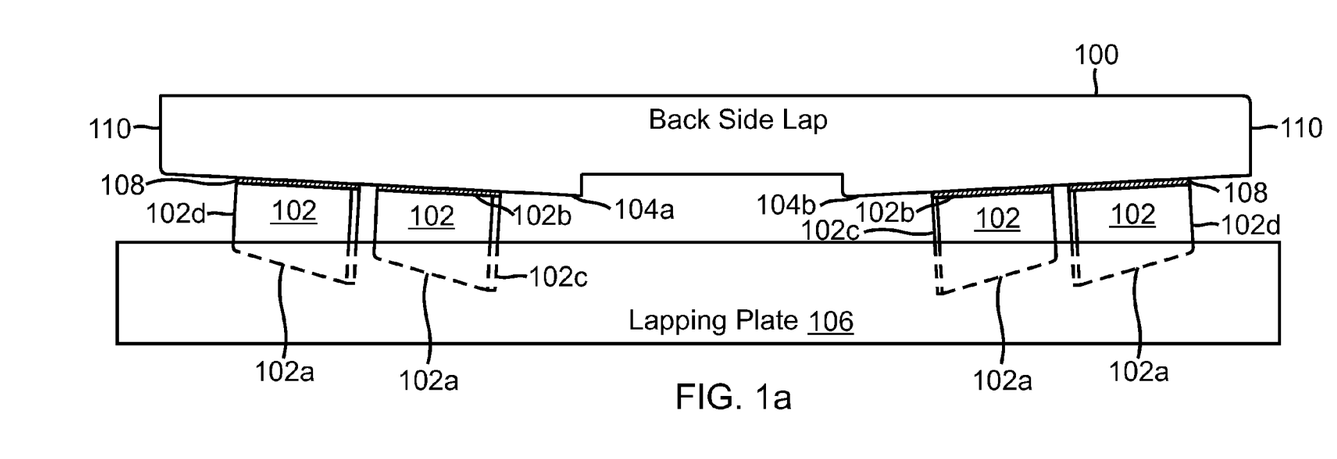
FIG. 1a is a schematic cross sectional view of a novel lapping ring and rowbars, that will be diced into multiple sliders, attached to opposing mounting surfaces of the lapping ring for inducing a preselected tilt angle on the backside surfaces of the rowbars as they are brought into contact with a lapping plate in accordance with one embodiment of the invention.

FIG. 1a is a schematic cross sectional side view of a novel lapping ring 100 and rowbars 102, that will be diced into multiple sliders, attached to opposing mounting surfaces (104a, 104b) of the lapping ring 100 for inducing a preselected tilt angle on the backside surfaces 102a of the rowbars 102 as they are brought into contact with a lapping plate 106 in accordance with one embodiment of the invention. The rowbars 102 are attached to the mounting surface (104a, 104b) using adhesive tape 108. The rowbars 102 each have a rectangular block shape including an ABS 102b opposite the backside surfaces 102a, a trailing edge surface 102c, a leading edge surface 102d, and two end surfaces (not visible).

The backside preselected tilt angle of the rowbars 102 is measured between the backside surface 102a and the trailing edge surface 102c. As can be seen in FIG. 1a, the backside preselected tilt angle is greater than 90 degrees and supplementary to a preselected angle of the mounting surfaces 104a measured between the mounting surfaces 104a and an outer surface 110 of the lapping ring 100. In several embodiments, the preselected angle of the mounting surfaces 104a is selected to substantially match an intended preselected tilt angle for the ABS 102b, which is measured relative to the trailing edge 102c.

In the embodiment illustrated in FIG. 1a, the preselected angle of the mounting surfaces 104a is less than 90 degrees. In other embodiments, the preselected angle of the mounting surfaces 104a can be greater than 90 degrees. In several embodiments, the lapping ring 100 can have a number of mounting surfaces where some of the mounting surfaces have preselected angles greater than 90 degrees and some of the mounting surfaces have preselected angles less than 90 degrees.

Figure 1B:
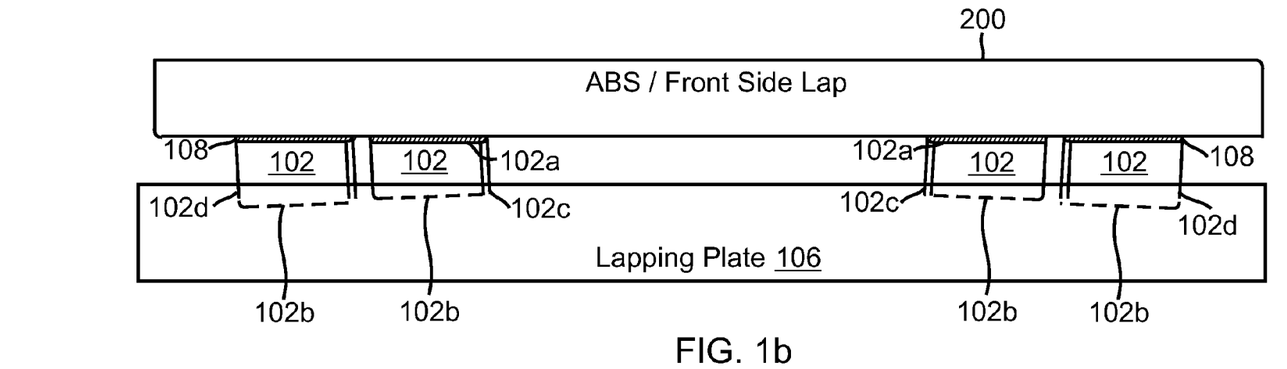
FIG. 1b is a schematic cross sectional view of a second lapping ring attached to the lapped backside surfaces having the preselected backside tilt angles of the rowbar/sliders of FIG. 1a as the air bearing surfaces (ABSs), opposite to the lapped backside surfaces, are brought into contact with a lapping plate for lapping the ABSs of the rowbars/sliders to be substantially parallel with the previously lapped backside surfaces in accordance with one embodiment of the invention.

FIG. 1b is a schematic cross sectional side view of a second lapping ring 200 attached to the lapped backside surfaces 102a having the preselected backside tilt angles of the rowbar/sliders 102 of FIG. 1a as the ABSs 102b are brought into contact with the lapping plate 106 for lapping the ABSs 102b to be substantially parallel with the previously lapped backside surfaces 102a in accordance with one embodiment of the invention.

In operation, and referring now to FIG. 1a, the rowbars 102 are cut from a wafer (not shown) and the intended ABSs 102b of one or more of the rowbars 102 are attached to the mounting surfaces (104a, 104b) of the lapping ring 100 with the adhesive tape 108. As further shown in FIG. 1a, the lapping ring 100 and mounted rowbars 102 are brought in contact with the lapping plate 106 and lapped until the backside surfaces 102a are substantially flat and thereby have the preselected backside tilt angle.

Referring now to FIG. 1b, the backside surfaces 102a of the rowbars 102 are attached to the second lapping ring 200 with the adhesive tape 108. The second lapping ring 200 (e.g., a flat lapping ring without inclined mounting surfaces) and mounted rowbars 102 are brought in contact with the lapping plate 106 and lapped until the ABSs 102b are substantially flat and thereby have the preselected ABS tilt angle which corresponds to the preselected angle of the mounting surfaces (104a, 104b) of the first lapping ring 100. In addition, the lapping of the ABSs 102b and flat nature of the mounting surfaces of the second lapping ring 200 ensure that the lapped ABSs 102b will be substantially parallel with the previously lapped backside surfaces 102a. At some point, the rowbars 102 will be diced into a number of sliders each having about the same cross sectional characteristics (e.g., parallelogram shape) of the rowbars. The parallelogram cross sectional shape can provide optimized magnetic performance for the sliders while also allowing for substantial pitch static attitude (PSA).

In one embodiment, the adhesive tape 108 can be any adhesive material including, without limitation, a thermal release tape adhesive, an ultraviolet release tape adhesive, a cyanoacrylate adhesive, a urethane hot melt adhesive, or other suitable adhesive material.

In the embodiments illustrated in FIGS. 1a and 1b, the backside surfaces are lapped first and then the ABSs. In other embodiments, the ABSs can be lapped first and then the backside surfaces can be lapped. The use of lapping and lapping plates is well known in the art.

In several embodiments, the lapping plate is a disk shaped plate made of a metal material (e.g., tin), a ceramic material, and/or other suitable materials. In several embodiments, a slurry including various diamond and lubricant materials is spread about on a top surface of the lapping plate to facilitate the lapping process.

Figure 2:
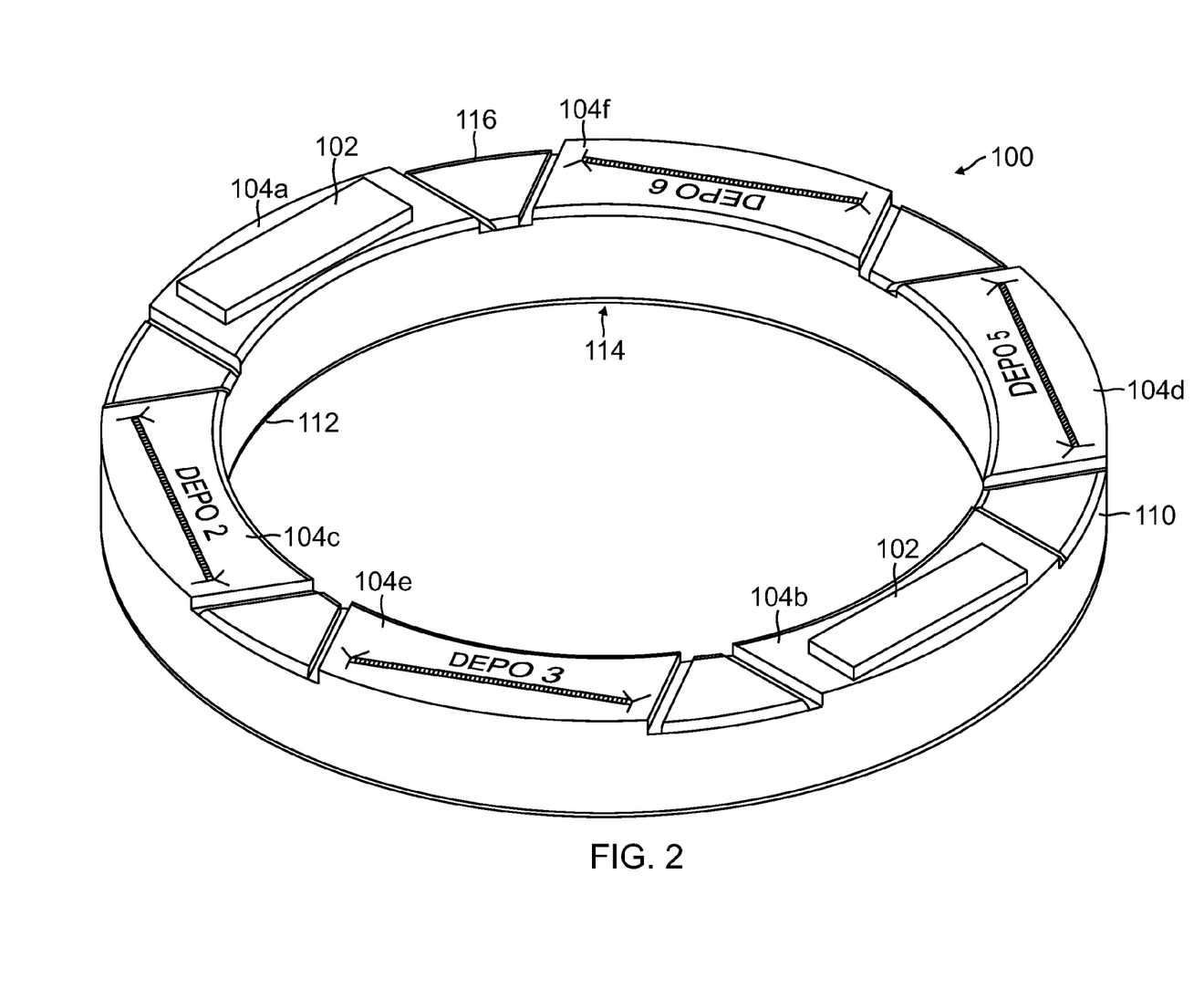
FIG. 2 is a top perspective view of a lapping ring having multiple row bar mounting surfaces that can be used to induce a preselected tilt angle on a backside surface of a rowbar, that will be diced into multiple sliders, for correcting slider parallelism in accordance with one embodiment of the invention.

FIG. 2 is a top perspective view of a lapping ring 100 having multiple row bar mounting surfaces (104a, 104b, 104c, 104d, 104e, 104f) that can be used to induce the preselected tilt angle on the backside surface of a rowbar (not visible but see FIGS. 1a and 1b) for correcting slider parallelism in accordance with one embodiment of the invention. The lapping ring 100 has a hollow cylindrical shape including an inner surface 112, an outer surface 110, a bottom surface 114, and a top surface 116.

The mounting surfaces (104a, 104b, 104c, 104d, 104e, 104f) are positioned along the top surface 116. More specifically, mounting surface 104a and mounting surface 104b are positioned along the top surface 116 such that they are on opposite ends of the lapping ring 100, and thereby are opposing mounting surfaces. Similarly, mounting surface 104c is positioned to oppose mounting surface 104d, and mounting surface 104e is positioned to oppose mounting surface 104f. As described above, one or more rowbars can be attached to one or more of the mounting surfaces to induce a preselected tilt angle on either the backside surface or the ABS of the rowbar. In some embodiments, each of the mounting surfaces has the same preselected mounting angle. In some embodiments, each pair of opposing mounting surfaces has a different preselected mounting angle. In one embodiment, each mounting surface has a different preselected mounting angle.

In several embodiments, the lapping ring is made of stainless steel or another suitable metal. In one embodiment, the lapping ring is made of one or more suitable ceramic materials. In other embodiments, the lapping ring can be made of other suitable materials. In one embodiment, the lapping ring has an outer diameter of about 6 inches, an inner diameter of about 4 inches, and a height of about 0.8 inches. In other embodiments, the lapping ring can have other suitable dimensions. In one embodiment, the lapping rings are adjustable such that the preselected angle of the mounting surfaces or height thereof can be adjusted. In several embodiments described herein, the lapping support has a ring shape. In other embodiments, other suitable shapes can be used (e.g., disk shape or other suitable shape).

Figure 3A:
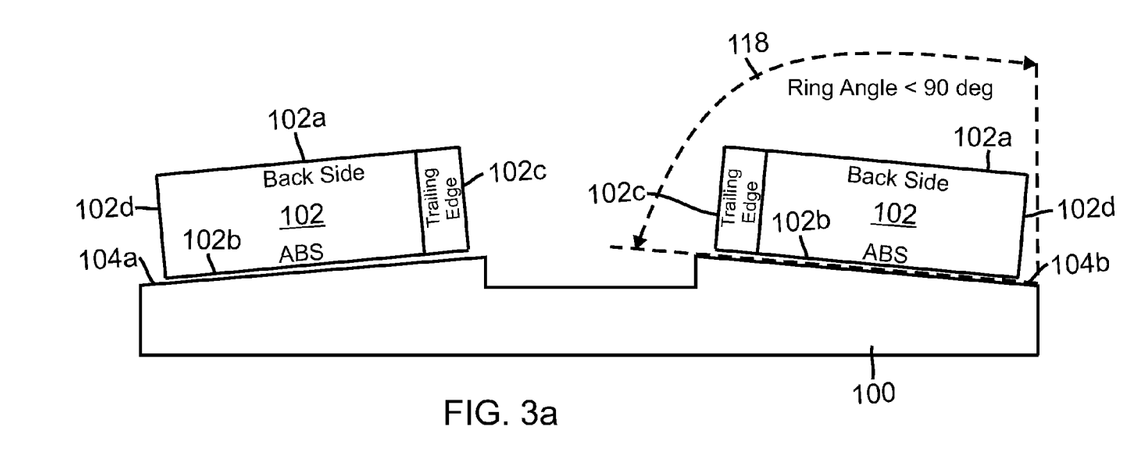
FIG. 3a is a schematic cross sectional view of the lapping ring of FIG. 2 and attached rowbars illustrating opposing mounting surfaces of the lapping ring having a preselected mounting angle of less than 90 degrees that substantially matches an intended preselected tilt angle for the ABS of the rowbars/sliders in accordance with one embodiment of the invention.

FIG. 3a is a schematic cross sectional view of the lapping ring 100 of FIG. 2 and attached rowbars 102 illustrating opposing mounting surfaces (104a, 104b) of the lapping ring 100 having a preselected mounting angle 118 of less than 90 degrees that substantially matches an intended preselected tilt angle for the ABS 102b for the rowbars/sliders 102 in accordance with one embodiment of the invention. The rowbars 102 can be attached to the mounting surfaces (104a, 104b) using adhesive tape (not shown in FIG. 3a but see FIGS. 1a and 1b).

Figure 3B:
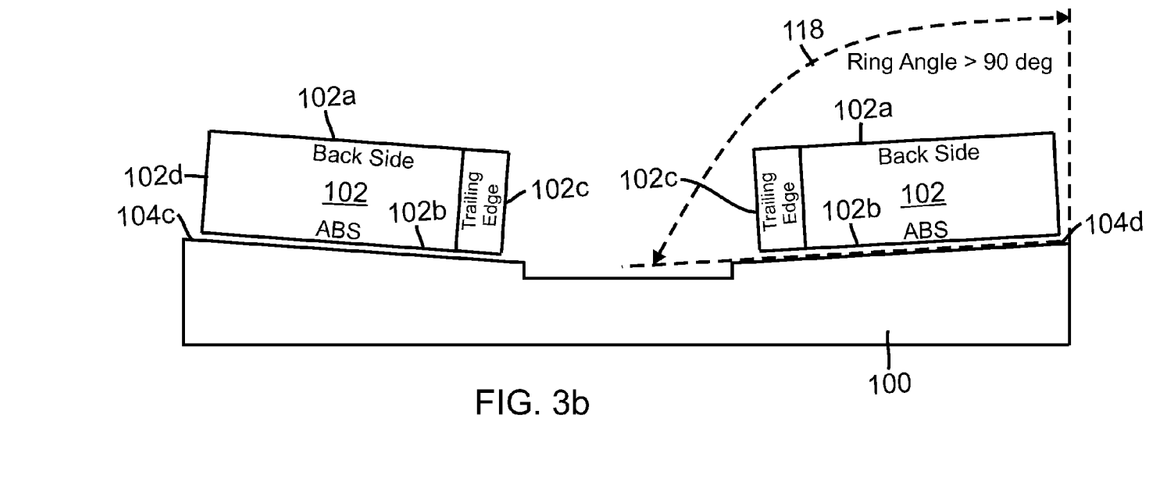
FIG. 3b is a schematic cross sectional view of the lapping ring of FIG. 2 and attached rowbars illustrating opposing mounting surfaces of the lapping ring having a preselected mounting angle of greater than 90 degrees that substantially match an intended preselected ABS tilt angle of the rowbars/sliders in accordance with one embodiment of the invention.

FIG. 3b is a schematic cross sectional view of the lapping ring 100 of FIG. 2 and attached rowbars 102 illustrating opposing mounting surfaces (104c, 104d) of the lapping ring 100 having a preselected mounting angle 118 of greater than 90 degrees that substantially matches an intended preselected ABS tilt angle of the rowbars/sliders 102 in accordance with one embodiment of the invention. The rowbars 102 can be attached to the mounting surfaces (104c, 104d) using adhesive tape (not shown in FIG. 3a but see FIGS. 1a and 1b).

Figure 4:
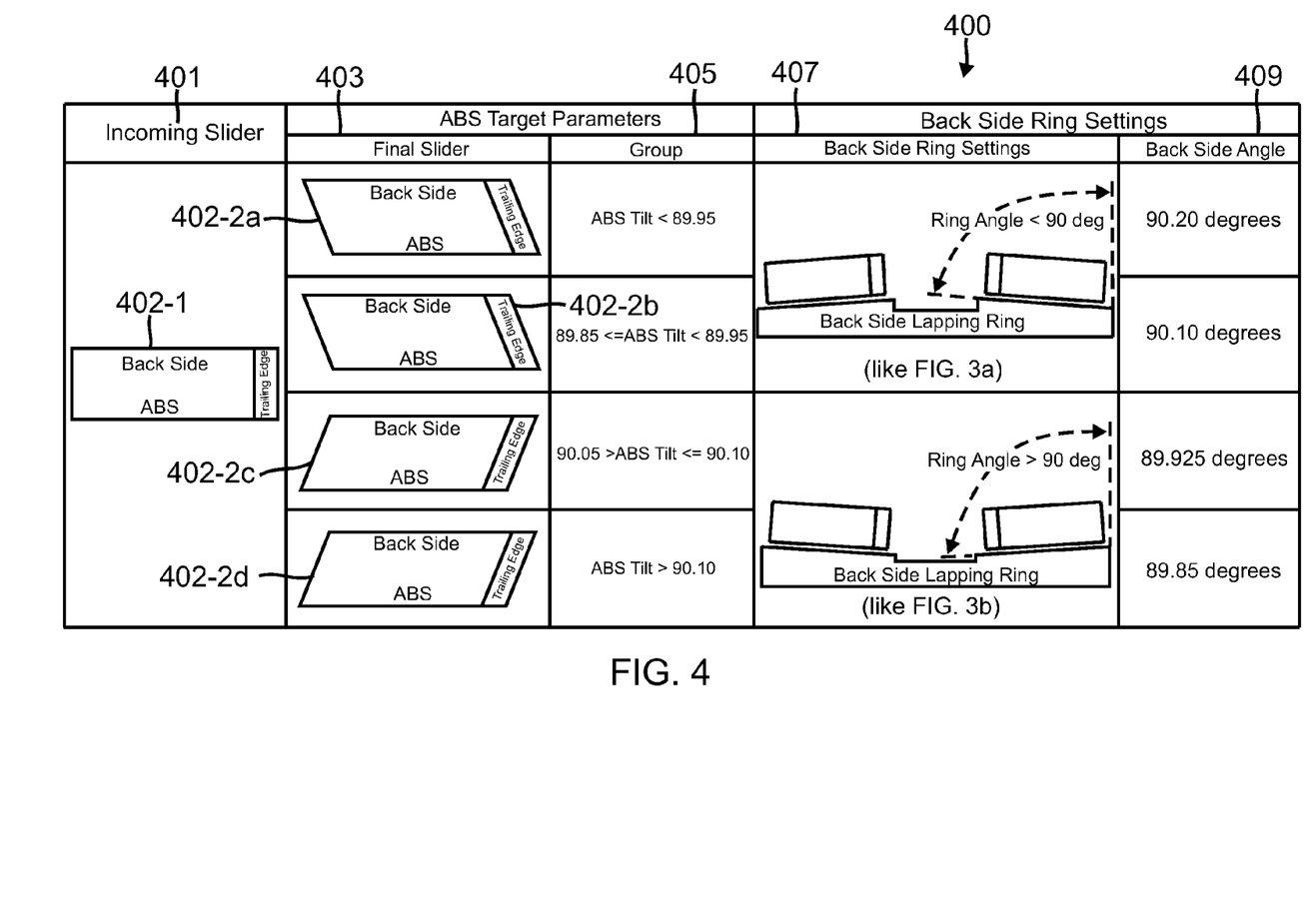
FIG. 4 is a table illustrating cross sectional views of a rowbar/slider prior to and after lapping for four different preselected ABS tilt angles and corresponding supplementary preselected backside tilt angles in accordance with one embodiment of the invention.

FIG. 4 is a table 400 illustrating cross sectional views of a rowbar/slider prior to (402-1) and after lapping (402-2a, 402-2b, 402-2c, 402-2d) for four different preselected ABS tilt angles and corresponding supplementary preselected backside tilt angles in accordance with one embodiment of the invention. The first column of the table 401 illustrates the cross section for the incoming rowbar/slider 402-1. The second column 403 illustrates the four potential cross sections for the final rowbar/slider (402-2a, 402-2b, 402-2c, 402-2d) for the corresponding four different preselected ABS tilt angles illustrated in the third column 405. The fourth column 407 illustrates the shape of the associated lapping ring having either the mounting surface angle less than 90 degrees as in FIG. 3a, or the mounting surface angle greater than 90 degrees as in FIG. 3b. The last column 409 illustrates the resulting backside surface tilt angle for each respective final rowbar/slider.

For example, consider the first row of the table 400 that shows the final rowbar/slider 402-2a for a group that has a preselected ABS tilt angle of less than 89.85 degrees (e.g., about 89.80 degrees to correspond with the preselected backside tilt angle of 90.20 degrees as they are supplementary angles in the parallelogram shape), uses the lapping ring mounting surfaces having preselected angles of less than 90 degrees (or more accurately, about 89.80 degrees to match the preselected ABS tilt angle), and has the preselected backside tilt angle of about 90.20 degrees.

In the embodiments illustrated in FIG. 4, certain values for the preselected angles of the ABS and backside surfaces are shown by way of example. In other embodiments, other suitable values can be used.

Figure 5:
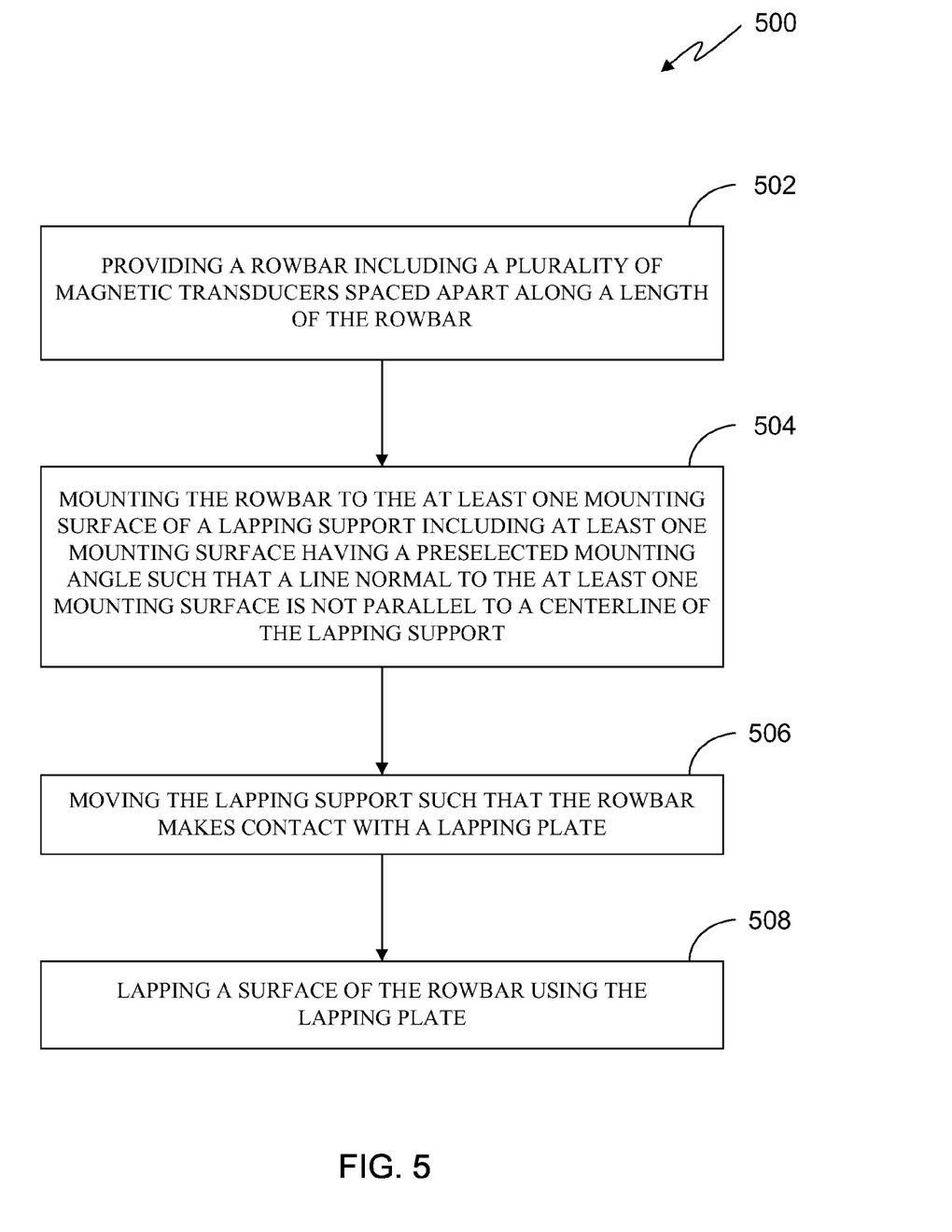
FIG. 5 is a flowchart of a process for lapping a rowbar/slider using a lapping ring for correcting slider parallelism in accordance with one embodiment of the invention.

FIG. 5 is a flowchart of a process 500 for lapping a rowbar/slider using a lapping support (e.g., lapping ring) for correcting slider parallelism in accordance with one embodiment of the invention. In particular embodiments, the process 500 can be used with any of the lapping supports/rings described above. The lapping support can have at least one mounting surface with a preselected mounting angle such that a line normal to the at least one mounting surface is not parallel to a centerline of the lapping support (e.g., angle of inclination for mounting surface is non-zero). The process first provides (502) a rowbar including a plurality of magnetic transducers spaced apart along a length of the rowbar. The process then mounts (504) the rowbar to the at least one mounting surface of the lapping support. In several embodiments, the ABS of the rowbar is mounted to the at least one mounting surface such that the backside surface can be lapped. The process then moves (506) the lapping support such that the rowbar makes contact with a lapping plate. The process then laps (508) a surface of the rowbar using the lapping plate. In several embodiments, the backside surface is the surface lapped.

In several embodiments, the process also flips the lapped rowbar and mounts it to a flat lapping support (e.g., second lapping support/ring). In such case, the process then moves the flat lapping support such that the rowbar is in contact with the lapping plate for a second duration. In several embodiments, the backside surface of the rowbar is lapped first and the ABS is lapped in the second lapping step such that the lapped ABS is substantially parallel to the lapped backside surface. In other embodiments, the order may be reversed.

In one embodiment, the process can perform the sequence of actions in a different order. In another embodiment, the process can skip one or more of the actions. In other embodiments, one or more of the actions are performed simultaneously. In some embodiments, additional actions can be performed.

In several embodiments, the resulting sliders are formed by processing a wafer which is generally used to manufacture sliders using a series of procedures. The wafer generally includes a number of magnetic transducers that have been arranged in rows. At first, the wafer can be subjected to a lapping process, a cleaning process, a depositing process and an etching process. Then, the processed wafer can be sliced into a number of row bars by a suitable cutting tool such as a diamond cutting wheel, where each row bar will ultimately be sectioned into a number of sliders. Next, each row bar is subjected to a series of subsequent procedures, such as lapping (e.g., where the actions of process 500 could be performed), photolithography, bonding and testing. Then, each row bar is cut into a number of individual sliders using a cutter, such as the diamond cutting wheel.

Figure 6:
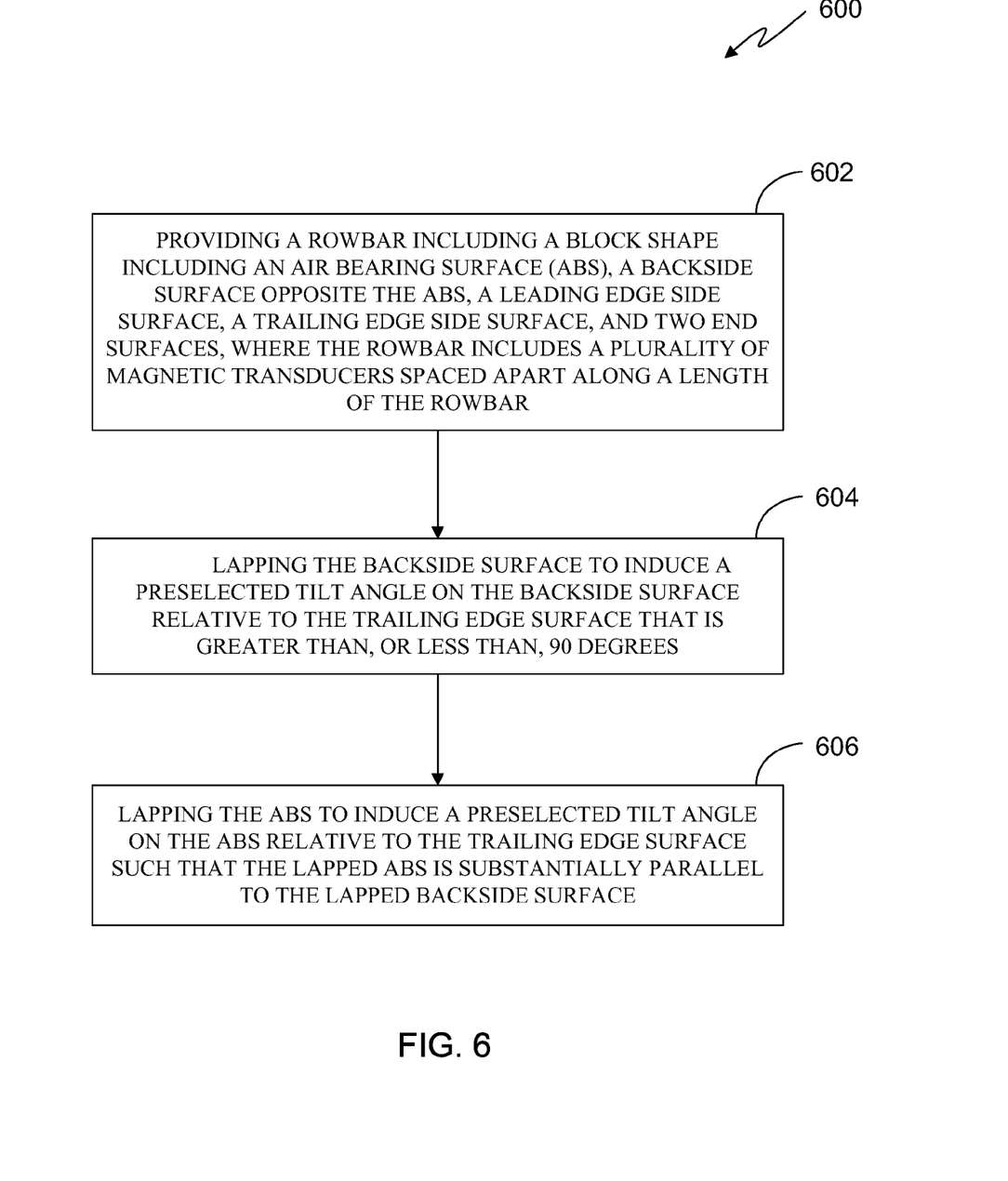
FIG. 6 is a flowchart of a process for lapping a rowbar/slider to correct for slider parallelism including inducing a preselected backside tilt angle on the rowbar/slider such that the lapped ABS is substantially parallel to the lapped backside surface in accordance with one embodiment of the invention.

FIG. 6 is a flowchart of a process 600 for lapping a rowbar/slider to correct for slider parallelism including inducing a preselected backside tilt angle on the rowbar/slider such that the lapped ABS is substantially parallel to the lapped backside surface in accordance with one embodiment of the invention. In particular embodiments, the process 600 can be used with any of the lapping systems described above. The process first provides (602) a rowbar including a block shape including an air bearing surface (ABS), a backside surface opposite the ABS, a leading edge side surface, a trailing edge side surface, and two end surfaces, where the rowbar includes a plurality of magnetic transducers spaced apart along a length of the rowbar.

The process then laps (604) the backside surface to induce a preselected tilt angle on the backside surface relative to the trailing edge surface that is greater than, or less than, 90 degrees. In several embodiments, the backside surface is lapped using one of the lapping supports having a mounting surface with a preselected tilt angle as described above. The process then laps (606) the ABS to induce a preselected tilt angle on the ABS relative to the trailing edge surface such that the lapped ABS is substantially parallel to the lapped backside surface. In several embodiments, the ABS is lapped using one of the flat lapping supports described above.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system for correcting slider parallelism, the system comprising:
    a lapping support comprising a ring shape having a centerline, the ring shape comprising at least one mounting surface being flat and having a preselected mounting angle such that a line normal to the at least one mounting surface is not parallel to the centerline of the ring shape;
    a rowbar comprising a plurality of magnetic transducers spaced apart along a length of the rowbar; and
    a lapping plate configured to lap the rowbar, the lapping plate comprising a flat lapping surface, wherein the lapping support is positioned such that a line normal to the lapping surface is parallel to the centerline of the ring shape,
    wherein the rowbar is mounted to the at least one mounting surface, and
    wherein the rowbar is configured to be brought into contact with the lapping surface.

2. The system of claim 1:
    wherein the rowbar comprises a block shape comprising an air bearing surface (ABS), a backside surface opposite the ABS, a leading edge side surface, a trailing edge side surface opposite the leading edge surface, and two end surfaces,
    wherein the ABS is mounted to the at least one mounting surface, and
    wherein the backside surface is configured to be lapped with the lapping plate such that the backside surface comprises a preselected tilt angle.

3. The system of claim 2:
    wherein the ABS is configured to be lapped to have a preselected tilt angle,
    wherein the preselected mounting angle of the at least one mounting surface is selected to substantially match the preselected ABS tilt angle, and
    wherein the preselected backside tilt angle is substantially supplementary to the preselected ABS tilt angle such that the ABS, after lapping, is substantially parallel to the backside surface, after lapping.

4. The system of claim 1, wherein the at least one mounting surface comprises a plurality of mounting surfaces each having a different preselected mounting angle.

5. The system of claim 1, wherein the at least one mounting surface comprises:
    a first mounting surface having a preselected mounting angle of about 90.2 degrees;
    a second mounting surface having a preselected mounting angle of about 90.1 degrees;
    a third mounting surface having a preselected mounting angle of about 89.925 degrees; and
    a fourth mounting surface having a preselected mounting angle of about 89.85 degrees.

6. The system of claim 1:
    wherein the ring shape of the lapping support is a cylindrical shape comprising an inner surface, an outer surface, a bottom surface, and a top surface; and
    wherein the at least one mounting surface is positioned along the top surface.

7. The system of claim 1:
    wherein the at least one mounting surface is configured to receive a plurality of rowbars, and
    wherein the lapping plate is configured to lap the plurality of rowbars.

8. The system of claim 1, wherein the rowbar is mounted to the mounting surface using an adhesive material.

9. The system of claim 8, wherein the adhesive material comprises an adhesive selected from the group consisting of a thermal release tape adhesive, an ultraviolet release tape adhesive, a cyanoacrylate adhesive, a urethane hot melt adhesive, and combinations thereof.

10. The system of claim 1, wherein a position of the at least one mounting surface is fixed with respect to the lapping support.

11. The system of claim 1, wherein the at least one mounting surface comprises a plurality of discrete mounting surfaces spaced apart from each other.

12. A method for correcting slider parallelism, the method comprising:
    providing a lapping support comprising a ring shape having a centerline, the ring shape comprising at least one mounting surface being flat and having a preselected mounting angle such that a line normal to the at least one mounting surface is not parallel to the centerline of the ring shape;
    providing a rowbar comprising a plurality of magnetic transducers spaced apart along a length of the rowbar; and
    mounting the rowbar to the at least one mounting surface of the lapping support;
    moving the lapping support such that the rowbar makes contact with a lapping plate comprising a flat lapping surface, wherein the lapping support is positioned such that a line normal to the lapping surface is parallel to the centerline of the ring shape; and
    lapping a surface of the rowbar using the lapping surface.

13. The method of claim 12:
    wherein the rowbar comprises a block shape comprising an air bearing surface (ABS), a backside surface opposite the ABS, a leading edge side surface, a trailing edge side surface opposite the leading edge surface, and two end surfaces, wherein the mounting the rowbar to the at least one mounting surface of the lapping support comprises mounting the ABS of the rowbar to the at least one mounting surface, and wherein the lapping the surface of the rowbar using the lapping plate comprises lapping the backside surface such that the backside surface comprises a preselected tilt angle.

14. The method of claim 13: further comprising:

mounting the backside surface of the rowbar to a mounting surface of the lapping support; and lapping the ABS of the rowbar using the lapping plate, wherein the ABS is configured to be lapped to have a preselected tilt angle, wherein the preselected mounting angle is selected to be substantially match the preselected ABS tilt angle, and wherein the preselected backside tilt angle is substantially supplementary to the preselected ABS tilt angle such that the lapped ABS is substantially parallel to the lapped backside surface.

15. The method of claim 12, wherein the at least one mounting surface comprises a plurality of mounting surfaces each having a different preselected mounting angle.

16. The method of claim 12, wherein the at least one mounting surface comprises:

a first mounting surface having a preselected mounting angle of about 90.2 degrees;

a second mounting surface having a preselected mounting angle of about 90.1 degrees;

a third mounting surface having a preselected mounting angle of about 89.925 degrees; and a fourth mounting surface having a preselected mounting angle of about 89.85 degrees.

17. The method of claim 12:

wherein the ring shape of the lapping support is a cylindrical shape comprising an inner surface, an outer surface, a bottom surface, and a top surface; and wherein the at least one mounting surface is positioned along the top surface.

18. The method of claim 12:

wherein the mounting the rowbar to the at least one mounting surface of the lapping support comprises mounting a plurality of rowbars to the at least one mounting surface, and wherein the lapping the surface of the rowbar using the lapping plate comprises lapping a surface of each of the plurality of rowbars using the lapping plate.

19. The method of claim 12, wherein the rowbar is mounted to the mounting surface using an adhesive material.

20. The method of claim 19, wherein the adhesive material comprises an adhesive selected from the group consisting of a thermal release tape adhesive, an ultraviolet release tape adhesive, a cyanoacrylate adhesive, a urethane hot melt adhesive, and combinations thereof.

21. The method of claim 12:

wherein the providing the rowbar comprising the plurality of magnetic transducers spaced apart along the length of the rowbar comprises:

providing a wafer on which a plurality of magnetic transducers have been formed in a plurality of rows;

cutting the wafer along the rows to form a plurality of rowbars, each comprising a block shape comprising an air bearing surface (ABS), a backside surface opposite the ABS, a leading edge side surface, a trailing edge side surface opposite the leading edge surface, and two end surfaces, and wherein the lapping the surface of the rowbar using the lapping plate comprises:

lapping the backside surface of each of the rowbars to induce a preselected tilt angle on the backside surface, the preselected backside tilt angle selected to be substantially supplementary to a preselected tilt angle intended for the ABS.

22. The method of claim 21:

wherein the at least one mounting surface comprises a plurality of mounting surfaces each having a different preselected mounting angle; and wherein the mounting the rowbar to the at least one mounting surface of the lapping support comprises selecting one of plurality of mounting surfaces that substantially matches the preselected ABS tilt angle and mounting one rowbar of the plurality of rowbars thereto.

23. The method of claim 22, wherein the lapping the surface of the rowbar using the lapping plate further comprises:

mounting the backside surface of the one rowbar to a mounting surface of the lapping support; and lapping the ABS of the one rowbar at the preselected ABS tilt angle such that the ABS of the one rowbar is substantially parallel to the backside surface of the one rowbar.

24. The method of claim 12, wherein a position of the at least one mounting surface is fixed with respect to the lapping support.

25. The method of claim 12, wherein the at least one mounting surface comprises a plurality of discrete mounting surfaces spaced apart from each other.

26. A method, for correcting slider parallelism, the method comprising:

providing a rowbar comprising a block shape comprising an air bearing surface (ABS), a backside surface facing directionally opposite the ABS, a leading edge side surface, a trailing edge-side surface, and two end surfaces, wherein the rowbar comprises a plurality of magnetic transducers spaced apart along a length of the rowbar;

lapping the backside surface to induce a preselected tilt angle on the backside surface relative to the trailing edge surface that is greater than, or less than, 90 degrees; and lapping the ABS to induce a preselected tilt angle on the ABS relative to the trailing edge surface such that the lapped ABS is substantially parallel to the lapped backside surface.

27. The method of claim 26, wherein the preselected backside tilt angle relative to the trailing edge surface is substantially supplementary to the preselected ABS tilt angle relative to the same trailing edge surface.

28. The method of claim 26, wherein the lapping the backside surface to induce the preselected tilt angle on the backside surface comprises lapping the backside surface using a lapping support comprising at least one mounting surface having a preselected mounting angle such that a line normal to the at least one mounting surface is not parallel to a centerline of the lapping support.

* * * * *